No. 882,068.  
PATENTED MAR. 17, 1908.

E. W. KELLER.

APPARATUS FOR MUFFLING THE EXHAUST OF MOTOR CYCLES.

APPLICATION FILED JUNE 13, 1906.

Witness  
K. M. Hopkins.  
A. Nelson.

Inventor  
Edwin W. Keller.  
by Harry Lea Dodson  
Attorney

UNITED STATES PATENT OFFICE.

EDWIN W. KELLER, OF CHICAGO, ILLINOIS, ASSIGNOR TO ARMAC MOTOR COMPANY, OF CHICAGO, ILLINOIS, A CORPORATION OF ILLINOIS.

APPARATUS FOR MUFFLING THE EXHAUST OF MOTOR-CYCLES.

No. 882,068.  Specification of Letters Patent.  Patented March 17, 1908.

Application filed June 13, 1906. Serial No. 321,460.

*To all whom it may concern:*

Be it known that I, EDWIN W. KELLER, a citizen of the United States, residing at Chicago, in the county of Cook and State of Illinois, have invented new and useful Apparatus for Muffling the Exhaust of Motor-Cycles, of which the following is a specification.

My invention relates to that class of motor cycles in which a gasolene engine is employed and has for its object to muffle the objectionable noise of the engine exhausting without creating undue back pressure upon the engine, and has for its further object to prevent the dust from being thrown up on the back of the rider of the machine.

Figure 1:
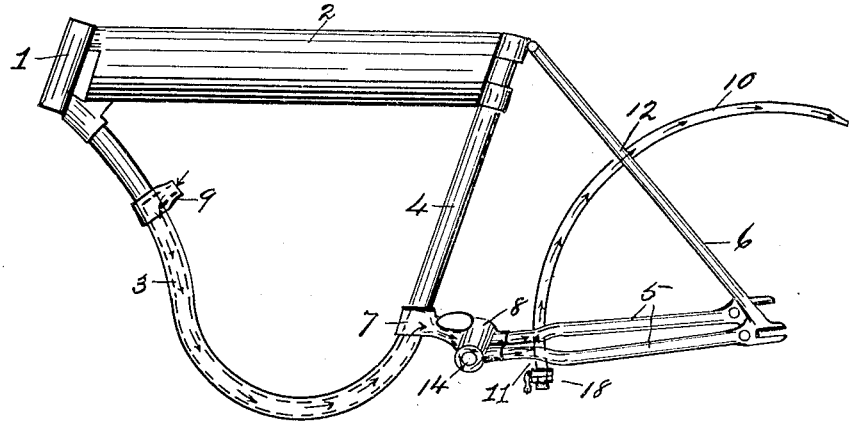
Figure 2:
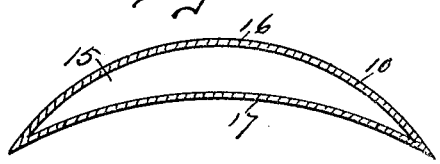
Figure 3:
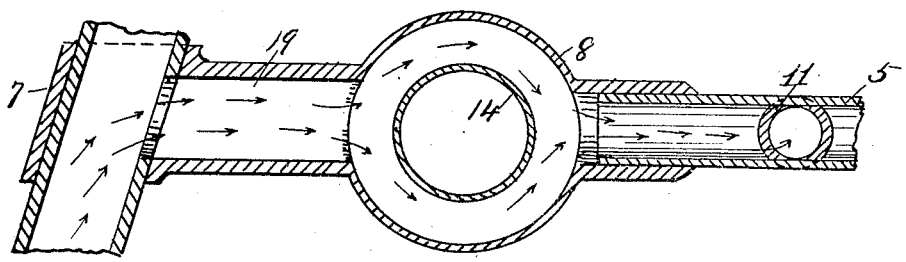

My means for accomplishing the foregoing may be more readily understood by having reference to the accompanying drawings, which are hereunto annexed and are a part of this specification, in which Figure 1 is a side view of a motor cycle frame having my improvement thereon. Fig. 2 is a cross section of the muffler. Fig. 3 is a detail view of the crank hanger and connections.

Similar figures refer to similar parts throughout the entire description.

In the drawings, the frame of the machine is constructed with a head 1, a top bar 2, lower bar 3 and seat post bar 4, and has rear forks and rear stays 5 and 6 respectively. A crank hanger 8 is mounted at the forward end of the rear forks and is secured to the seat post bar 4 by means of a lug 7. This lug is constructed with a passage extending through and connecting with both the interior of the seat post 4 and the crank hanger 8, the said crank hanger being provided with a sleeve 14 which prevents the exhaust gases from coming in contact with the bearings but leaves a passage for the gases, as indicated by the arrows. A lug 9 is mounted upon the lower bar 3 and has a passage therein in communication with the interior of the lower bar 3.

My improved muffler 10, which takes the form of a mud guard, is mounted upon cross braces 11 and 12 in the rear forks and rear stays respectively, and is constructed as better shown in the detail view with a large chamber 15 between the walls 16 and 17 thereof. This chamber is in communication with the interior of the cross bar tube 11, which in turn is in communication with the interior of the rear forks.

It may be found desirable in practice to provide the escape valve 18 at the bottom of the muffler 10 so that when the pressure of the exhaust is raised by the increase of speed of the engine, it will automatically open and relieve the engine of any back pressure by increasing the area of the exhaust openings. The result is when the exhaust is turned into the lug 9 the burned gases pass downwardly through the lower bar 3 up to the lug 7, thence through the passage 19 into the interior of the crank hanger 8; whence it passes through the rear forks into the cross bar 11, where it enters the interior chamber 15 of the mud guard, through which it passes until it is finally ejected at the back of the rear wheel through openings provided in the muffler mud guard for that purpose. The result of this discharge, which is necessarily with some degree of force, is that the current of burned gases, meeting the upwardly thrown particles of dust which have been impelled in an upward direction by the motion of the rear wheel, dissipates them to a very considerable degree so that they fail entirely to reach the rider of the machine.

Although I have shown a particular form of mud guard, it will be obvious it need not be of this particular shape, which can be varied without departing from the spirit of my invention.

Having described my invention, what I regard as new and desire to secure by Letters Patent is 1. In a device of the character described, the combination with a motor cycle frame having a head, a top bar, seat post bar and lower bar, said seat post bar and lower bar being formed of a single continuous piece of tubing, of a lug mounted upon said lower bar, there being a passage through said lug to the interior of the said lower bar, a crank hanger located at the forward end of the rear forks, said hanger being connected to the said seat post bar by a lug having an interior passage therein communicating both with the interior of the crank hanger and the interior of the seat post bar, and a mud guard having an annular chamber formed therein mounted upon the said rear forks, there being a passage from the chamber in said mud guard to the interior of the crank hanger, for the purpose set forth substantially as described.

2. In a device of the character described, the combination with a motor cycle frame having a head, a top bar, seat post bar and lower bar, said seat post bar and lower bar being formed of a single continuous piece of tubing, of a lug mounted upon said lower bar, there being a passage through said lug to the interior of the said lower bar, a crank hanger located at the forward end of the rear forks, said hanger being connected to the said seat post bar by a lug having an interior passage therein communicating both with the interior of the crank hanger and the interior of the seat post bar, a sleeve in said hanger to prevent the burned gases from coming in contact with the bearings, a mud guard having an annular chamber formed therein mounted upon the said rear forks, there being a passage from the chamber in said mud guard to the interior of the crank hanger, for the purpose set forth substantially as described.

3. In a device of the character described, the combination with a motor cycle frame having a head, a top bar, seat post bar and lower bar, said seat post bar and lower bar being formed of a single continuous piece of tubing, of a lug mounted upon said lower bar, there being a passage through said lug to the interior of the said lower bar, a crank hanger located at the forward end of the rear forks, said hanger being connected to the said seat post bar by a lug having an interior passage therein communicating both with the interior of the crank hanger and the interior of the seat post bar, a sleeve in said hanger to prevent the burned gases from coming in contact with the bearings, a mud guard having an annular chamber formed therein mounted upon the said rear forks, there being a passage from the chamber in said mud guard to the interior of the crank hanger, and means to automatically relieve the pressure when it raises above a certain point, for the purpose set forth substantially as described.

4. In a device of the character described, the combination with a motor cycle frame having a head, a top bar, seat post bar and lower bar, said seat post bar and lower bar being formed of a single continuous piece of tubing, of a lug mounted upon said lower bar, there being a passage through said lug to the interior of the said lower bar, a crank hanger located at the forward end of the rear forks, said hanger being connected to the said seat post bar by a lug having an interior passage therein communicating both with the interior of the crank hanger and the interior of the seat post bar, a sleeve in said hanger to prevent the burned gases from coming in contact with the bearings, a mud guard having an annular chamber formed therein mounted upon the said rear forks, there being a passage from the chamber in said mud guard to the interior of the crank hanger, and means to automatically relieve the pressure when it raises above a certain point, said means consisting of a spring-actuated valve at the lower end of said mud guard, for the purpose set forth substantially as described.

EDWIN W. KELLER.

Witnesses:
C. M. BURROW,
A. NELSON.